Patented Nov. 19, 1940

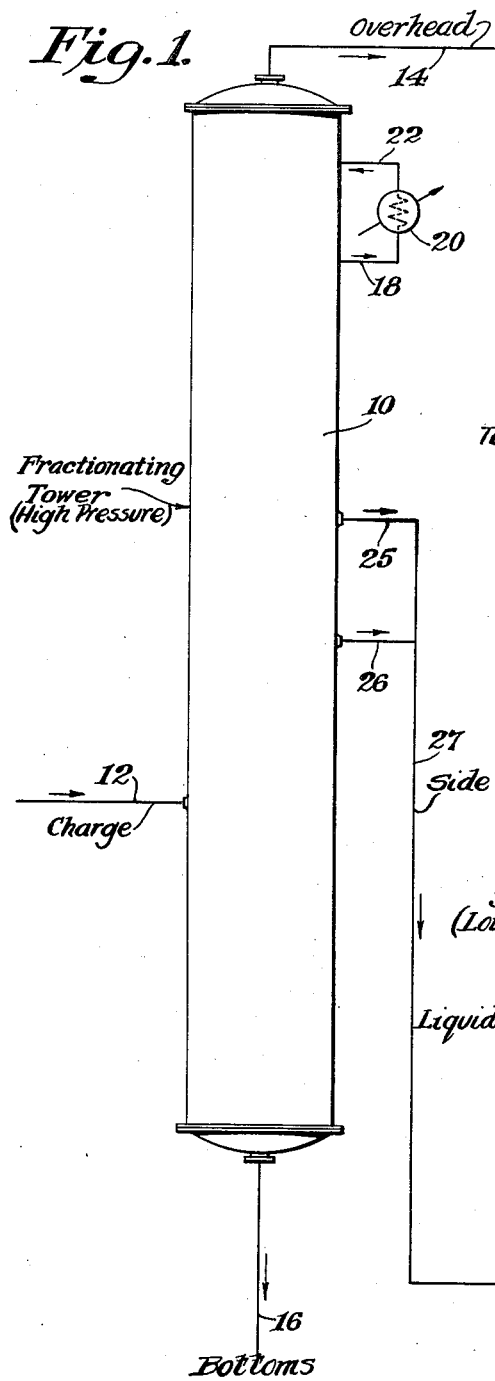
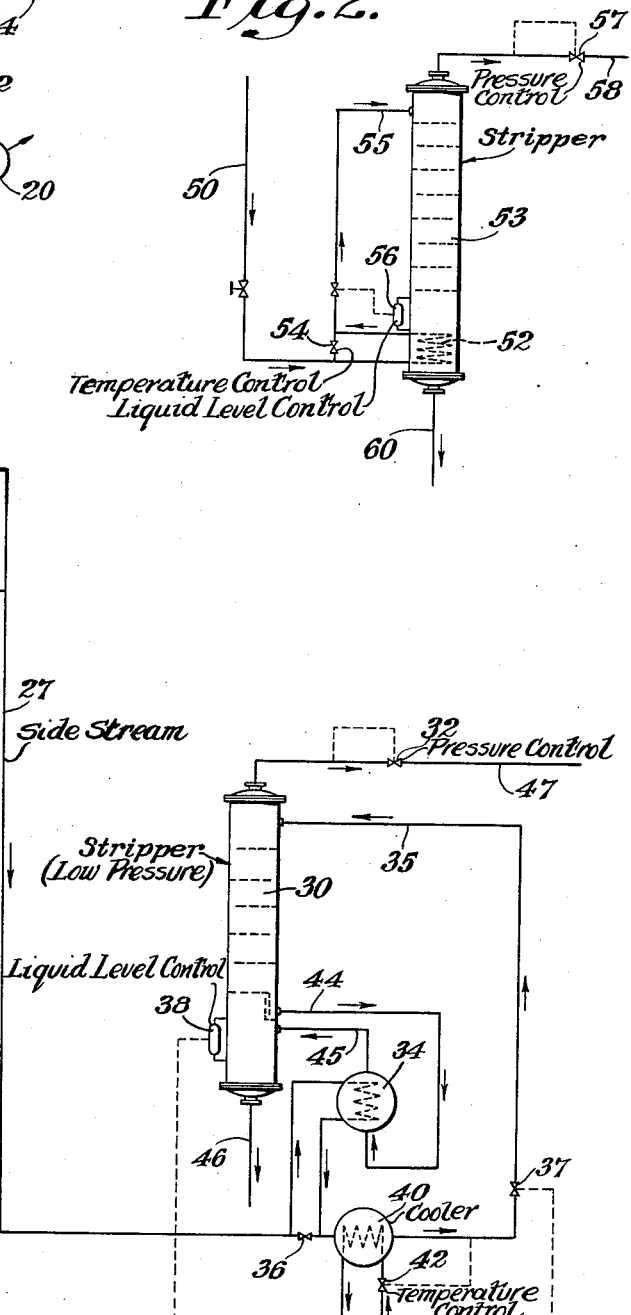

2,222,583

UNITED STATES PATENT OFFICE 2,222,583

DISTILLATION PROCESS

Wheaton W. Kraft, New York, N. Y., assignor to The Lummus Company, New York, N. Y., a corporation of Delaware Application April 2, 1938, Serial No. 199,548

1 Claim. (Cl. 196—94)

This invention relates to an improvement in the method of distilling petroleum materials.

The principal object of this invention is to provide an improved process in the refining of hydrocarbons for the production of intermediate fractions of controlled boiling range, and to more effectively remove low boiling material for a sharper separation of the respective side streams.

Another object of the invention is to provide for the controlled separation of side stream fractions by indirect addition of heat in the secondary distillation for removal of the low boiling material which is normally in equilibrium in the liquid withdrawn from the main distillation equipment.

The invention is more particularly an improvement in side stream stripping by reboiling as distinguished from stripping as carried out through contacting the liquid with steam or inert gas. In its more specific form, the respective fractionating towers are operated under such a pressure differential that the heat contained in the side stream at the higher pressure can be used to reboil the liquid in the stripping column under the lower pressure.

Further objects and advantages of the invention will appear from the following description of preferred forms of embodiment thereof taken in connection with the attached drawing illustrative thereof and in which:

Figure 1 is a diagrammatic layout of a fractionating column and a stripping column when external reboiling is practiced; and Figure 2 is a diagrammatic layout of a modified arrangement of distilling units in which reboiling is accomplished under modified control.

In accordance with a preferred form of embodiment of my invention, the tower 10 is a suitable type of fractionating tower having bubble decks (not shown) by which the vapors from an incoming heated mixture of hydrocarbons at 12 are suitably fractionated. A pressure distillate discharges overhead at 14 and a heavy oil residue (gas oil) is removed as a bottoms product at 16. Suitable reflux may be removed at 18, cooled at 20 and returned at 22.

The side streams which are to be corrected as to low boiling material may be removed from one or more intermediate points such as at 25 and 26, such liquid being drawn off through one or more separate pipes 27 for stripping as is well known. The manner of controlling the content of low boiling fractions of these streams is the subject of the present invention.

The stripping column 30 to which the side streams are discharged is also of a suitable type, having the usual bubble decks, but it is operated at a relatively low pressure as compared with the fractionating tower 10. As an example, the tower 10 may be maintained at a pressure of two hundred pounds per square inch, while the stripping column 30 is operated at a lower pressure in the range of thirty pounds per square inch, maintained by pressure control 32. The result is that with the unstripped stream leaving the fractionating tower 10 at a temperature in the range of 650° F., there is substantial available heat at the effective temperature of 480° F. required for driving off the low boiling material at the lower pressure existing in the stripping column. The temperatures and pressures are given solely as examples of specific working conditions.

To take advantage of the heat in the side stream 27, it is run through a reboiler heat exchanger 34 before it is discharged into the top of the stripping column at 35. The stripped liquid within the column collects on the lowermost tray of stripping column 30 and is circulated through this reboiler heat exchanger 34 by the pipes 44 and 45, by which means heat is transferred to the column for the desired purpose. Suitable valves 36 and 37, the latter of which is controlled by the liquid level control 38, maintain the desired flexibility of control for variable operating conditions, and if additional heat must be removed to prevent too great initial vaporization after expansion of the stream through valve 37, a supplemental cooler 40, having a temperature regulator 42, can be used.

The stripped, and corrected side stream product is removed at 46 with the low boiling material removed overhead at 47. The pressure control 32 is conveniently in this line.

It will be obvious that great flexibility is possible with this flow arrangement. Not only can pressure be carefully controlled at 32 with resulting change of temperature level in the stripping tower 30, but temperature may be precisely controlled at 42 to prevent excess flashing of low boiling material.

A modified differential pressure reboiling arrangement is shown in Figure 2 in which the side stream 50 passes through internal coil 52 in the base of the stripper 53 with a bypass 54 used to control the amount of heat by controlling the volume of side stream passing into the heating coil. The side stream enters the stripper at 55. Liquid level control 56 maintains a liquid level in the stripper and, as in the prior case, a pressure control 57 is provided on the low boiling material discharging as vapor at 58. The corrected product is discharged at 60.

It will thus be apparent that reboiling for stripping purposes can be accomplished by the side stream itself under a differential pressure operation. In each case the resulting heat will adequately drive off the undesired low boiling material so that the resulting side stream will be a more sharply separated product. In one case, variable control is provided, while in the other, simplified and more economical construction is provided, but with less flexibility and control.

While I have described preferred forms of embodiment of my invention, I am aware that other modifications may be made thereto, and I therefore desire a broad interpretation of my invention within the scope and spirit of the description herein and of the claim appended hereafter.

I claim:

In a process of treating hydrocarbons wherein a hydrocarbon mixture is fractionated in a fractionation column and a side stream is withdrawn from the fractionation column and thereafter cooled and introduced into a stripping column for removal of undesired low boiling material therefrom and wherein the stripping column is maintained at a lower pressure than that at which the fractionation column is operated and the reboiling heat for the stripping column is provided by heat interchange of the side stream with the stripping column bottoms before the side stream is introduced into the stripping column, the improvement which comprises passing only a portion of the side stream in heat exchange with the stripping column bottoms to supply only sufficient heat to effect the desired amount of stripping of low boiling material and additionally cooling the entire side stream subsequent to the heat exchange step and before discharge thereof into the stripping column only to a temperature at which initial vaporization of at least the undesired low boiling material takes place under the pressure at which the stripping column is maintained.

WHEATON W. KRAFT.